US012645511B2

(12) United States Patent
Hu

(10) Patent No.: US 12,645,511 B2
(45) Date of Patent: Jun. 2, 2026

(54) FULL EVENT TRACKING METHOD AND APPARATUS FOR PAGE, COMPUTER DEVICE, AND STORAGE MEDIUM

(71) Applicant: Beijing Volcano Engine Technology Co., Ltd., Beijing (CN)

(72) Inventor: Po Hu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/967,137

(22) Filed: Dec. 3, 2024

(65) Prior Publication Data

US 2025/0199888 A1 Jun. 19, 2025

(30) Foreign Application Priority Data

Dec. 18, 2023 (CN) .......................... 202311743792.7

(51) Int. Cl.
*G06F 9/54* (2006.01)

(52) U.S. Cl.
CPC .................................... *G06F 9/542* (2013.01)

(58) Field of Classification Search
None
See application file for complete search history.

(56) References Cited

U.S. PATENT DOCUMENTS

2010/0082769 A1* 4/2010 Bertin ................... G06F 16/958
719/330
2018/0364990 A1* 12/2018 Guan ........................ G06F 8/36

2022/0058063 A1* 2/2022 Moscatiello ........ G06F 9/44542
2022/0217434 A1* 7/2022 Volk .................... H04N 21/4722
2023/0058609 A1* 2/2023 Herren .................. G06F 11/302

FOREIGN PATENT DOCUMENTS

CN 114356429 A * 4/2022
CN 115242862 A * 10/2022 ............. H04L 67/02
CN 116150536 A * 5/2023

OTHER PUBLICATIONS

Gao et al.; English translation corresponding to CN116150536A; May 23, 2023. (Year: 2023).*
Ning; English translation corresponding to CN114356429A; Apr. 15, 2022. (Year: 2022).*
Zhou; English translation corresponding to CN 115242862A; Oct. 25, 2022. (Year: 2022).*
Rozell; "App-to-app communication with React Native on Android"; Apr. 4, 2018; Microsoft ISE Developer Blog, pp. 1-14. (Year: 2018).*

* cited by examiner

*Primary Examiner* — Umut Onat

(57) ABSTRACT

A full event tracking method and apparatus for pages, a computer device, and a storage medium are provided. A computer device may obtain Native pages of an application program of a mobile terminal and a system operating environment. The computer device may also detect a number of React Native pages included in the Native pages. In addition, the computer device may generate, based on the number of React Native pages and the system operating environment, a page view event tracking of entering the React Native page and a page leave event tracking of leaving the React Native page.

19 Claims, 10 Drawing Sheets

Obtain Native pages of an application program of a mobile terminal and a system operating environment — S101

Detect a number of React Native pages included in the Native pages — S102

Generate, based on the number of React Native pages and the system operating environment, a page view event tracking of entering the React Native pages and a page leave event tracking of leaving the React Native pages — S103

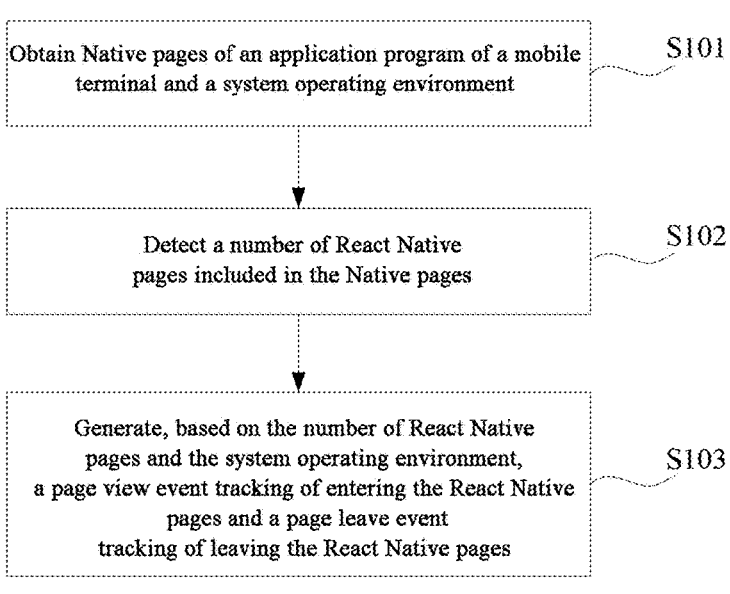

Obtain Native pages of an application program of a mobile terminal and a system operating environment — S101

Detect a number of React Native pages included in the Native pages — S102

Generate, based on the number of React Native pages and the system operating environment, a page view event tracking of entering the React Native pages and a page leave event tracking of leaving the React Native pages — S103

FIG.1

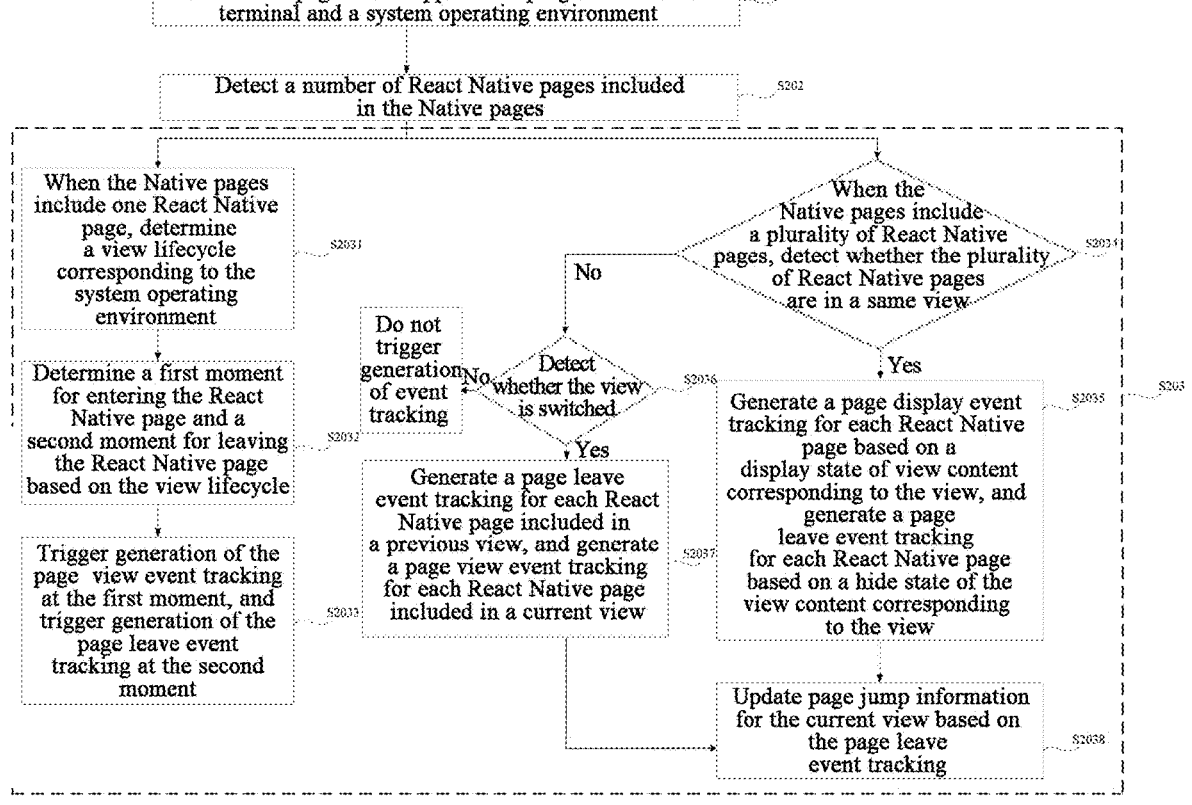

Obtain Native pages of an application program of a mobile terminal and a system operating environment — S201

Detect a number of React Native pages included in the Native pages — S202

When the Native pages include one React Native page, determine a view lifecycle corresponding to the system operating environment — S2031

Determine a first moment for entering the React Native page and a second moment for leaving the React Native page based on the view lifecycle — S2032

Trigger generation of the page view event tracking at the first moment, and trigger generation of the page leave event tracking at the second moment — S2033

Do not trigger generation of event tracking — S2034

No

Detect whether the view is switched — S2036

No

Yes

Generate a page leave event tracking for each React Native page included in a previous view, and generate a page view event tracking for each React Native page included in a current view — S2037

When the Native pages include a plurality of React Native pages, detect whether the plurality of React Native pages are in a same view — S2034'

Yes

Generate a page display event tracking for each React Native page based on a display state of view content corresponding to the view, and generate a page leave event tracking for each React Native page based on a hide state of the view content corresponding to the view — S2035

Update page jump information for the current view based on the page leave event tracking — S2038

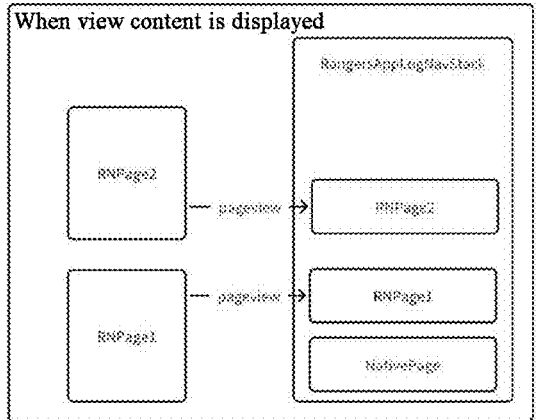
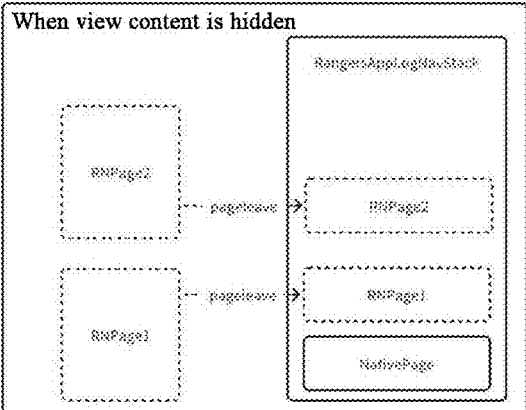
FIG.12
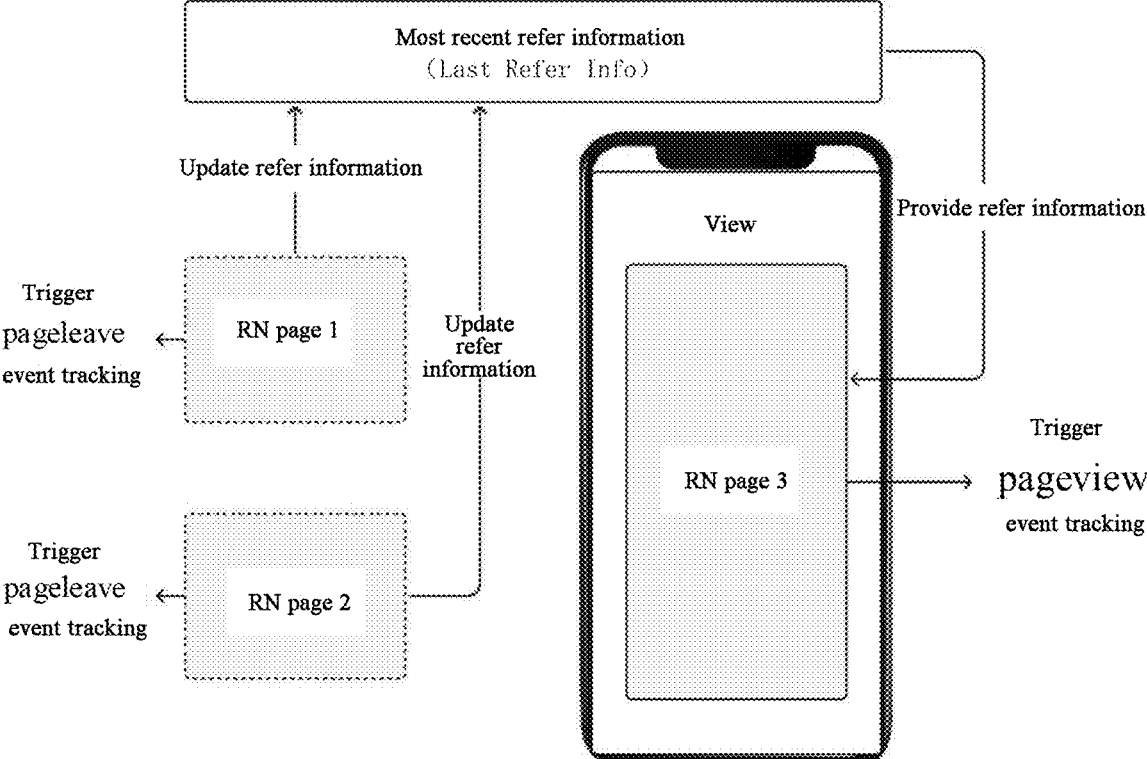
FIG.13

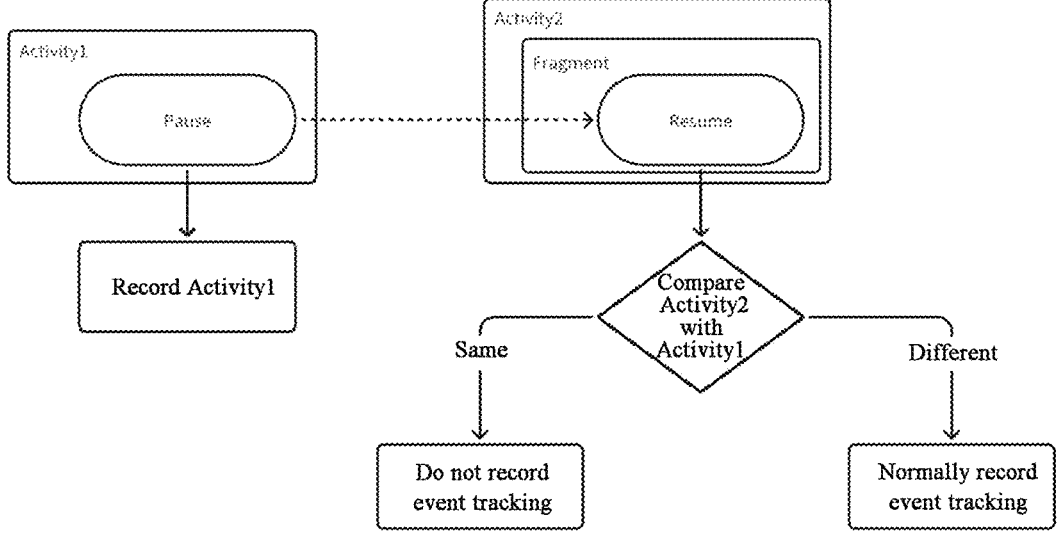
FIG.16
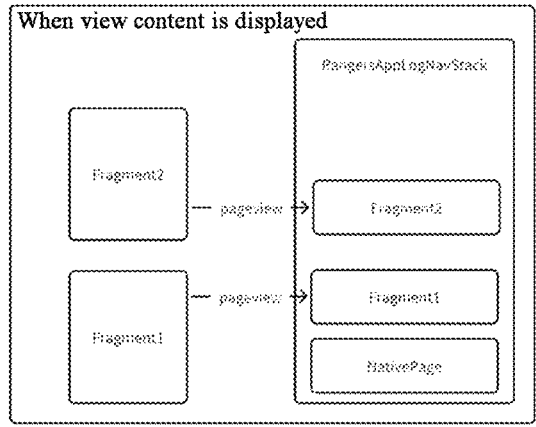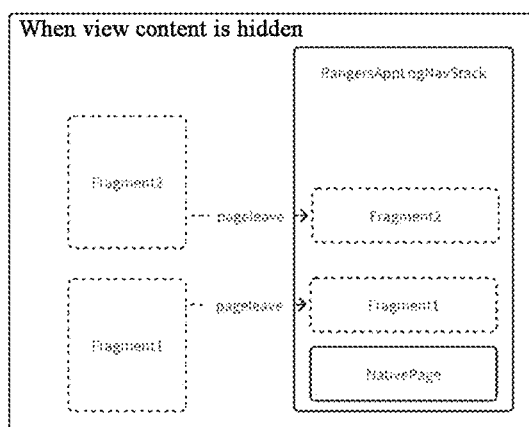
FIG.17

FULL EVENT TRACKING METHOD AND APPARATUS FOR PAGE, COMPUTER DEVICE, AND STORAGE MEDIUM

CROSS-REFERENCE TO RELATED APPLICATION(S)

This application claims priority to Chinese Application No. 202311743792.7 filed on Dec. 18, 2023, the disclosure of which is incorporated herein by reference in its entity.

TECHNICAL FIELD

The present disclosure relates to the field of computer technologies, and in particular, to a full event tracking method and apparatus for pages, a computer device, and a storage medium.

BACKGROUND

Under a React Native framework, it is necessary to implement full event tracking of a page view event tracking (pageview) and a page leave event tracking (pageleave) to automatically generate event tracking information for a native interactive (React Native, RN) page, thereby reducing the event tracking cost of developers.

SUMMARY

According to a first aspect, embodiments of the present disclosure provide a full event tracking method for pages, the method comprising: obtaining Native pages of an application program of a mobile terminal and a system operating environment; detecting a number of React Native pages included in the Native pages; and generating, based on the number of React Native pages and the system operating environment, a page view event tracking of entering the React Native page and a page leave event tracking of leaving the React Native page.

According to a second aspect, embodiments of the present disclosure provide a full event tracking apparatus for pages, the apparatus comprising: an obtaining module, configured to obtain Native pages of an application program of a mobile terminal and a system operating environment; a detecting module, configured to detect a number of React Native pages included in the Native pages; and an event tracking module, configured to generate, based on the number of React Native pages and the system operating environment, a page view event tracking of entering the React Native page and a page leave event tracking of leaving the React Native page.

According to a third aspect, embodiments of the present disclosure provide a computer device, comprising: a memory and a processor, wherein the memory and the processor are communicatively connected to each other, computer instructions are stored in the memory, and the processor executes the computer instructions to execute the full event tracking method for pages according to the first aspect or any of the corresponding implementations.

According to a fourth aspect, embodiments of the present disclosure provide a computer-readable storage medium, wherein the computer-readable storage medium is stored with computer instructions, and the computer instructions are configured to cause a computer to execute the full event tracking method for pages according to the first aspect or any of the corresponding implementations.

BRIEF DESCRIPTION OF THE DRAWINGS

For a clearer illustration of specific implementations of the present disclosure or the technical solutions in the prior art, the accompanying drawings used in the descriptions of the specific implementations or the prior art are briefly described below. Apparently, the accompanying drawings in the following descriptions show some implementations of the present disclosure. Those of ordinary skill in the art may still derive other drawings from these accompanying drawings without creative efforts.

FIG. 1 is a schematic flowchart of a full event tracking method for pages according to some embodiments of the present disclosure;

FIG. 2 is a schematic flowchart of another full event tracking method for pages according to some embodiments of the present disclosure;

FIG. 12 is a schematic diagram of page event tracking triggering in an IOS operating environment according to some embodiments of the present disclosure;

FIG. 13 is a schematic diagram of event tracking triggering and generation of page jump information according to some embodiments of the present disclosure;

FIG. 16 is a schematic diagram of event tracking triggering when an application is switched between foreground and background in an ANDROID operating environment according to some embodiments of the present disclosure;

FIG. 17 is a schematic diagram of page event tracking triggering in an ANDROID operating environment according to some embodiments of the present disclosure;

DETAILED DESCRIPTION

Figure 3:
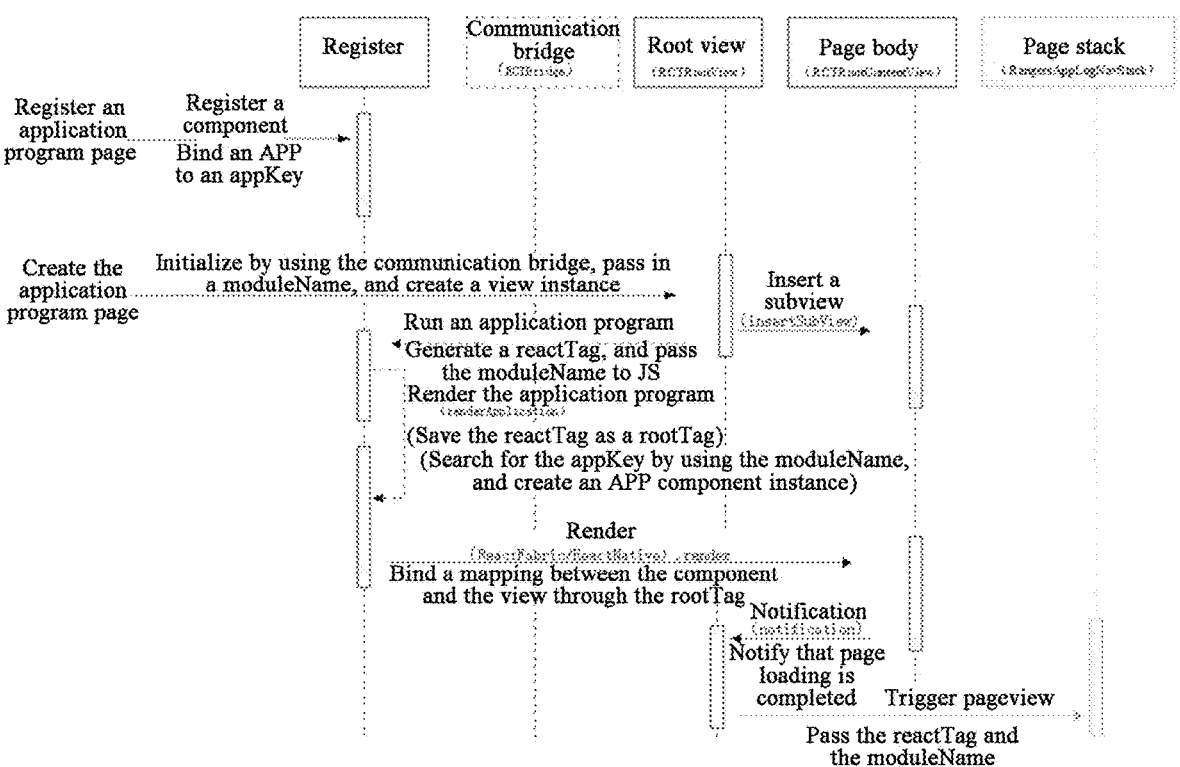
FIG. 3 is a flowchart of event tracking in an IOS operating environment according to some embodiments of the present disclosure.

To make the objectives, technical solutions, and advantages of the embodiments of the present disclosure clearer, the technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Currently, to implement full event tracking of pageview and pageleave of a React Native page under a React Native framework, a view event and a leave event of an IOS/ANDROID page are listened to. If it is determined that the page is a React Native page, pageview event tracking and pageleave event tracking are automatically collected.

However, the above implementation of full event tracking is implemented together with IOS/ANDROID full event tracking, and it is difficult to be independent of a native full event tracking function. In addition, the implementation needs to be used with an IOS/ANDROID software development kit (SDK), and cannot be used independently as a plug-in. When there are a plurality of React Native pages in a Native page of IOS/ANDROID, it is difficult to implement full event tracking of the React Native page, and it is also difficult to implement full event tracking of a React Native page integrated in an ANDROID environment in a fragment manner.

In view of this, embodiments of the present disclosure provide a full event tracking method and apparatus for pages, a computer device, and a storage medium, to solve the problem that when there are a plurality of React Native pages in a Native page, it is difficult to implement full event tracking of the React Native page. In the full event tracking method for pages provided in some embodiments of the present disclosure, by detecting the number of React Native pages included in the Native page, and in combination with the number of React Native pages and the system operating environment of the mobile terminal, automatic collection of the page view event tracking and the page leave event tracking is performed for each React Native page. Therefore, it is no longer limited to event tracking of a single React Native page, and full event tracking for a plurality of React Native pages is implemented. In addition, independent full event tracking of the React Native page is implemented, and no longer depends on a full event tracking technology of the Native page. Moreover, full event tracking can be implemented with the system operating environment, thereby enhancing the adaptability of event tracking.

The technical solution of the present disclosure performs automatic collection of pageview event tracking and pageleave for each React Native page in combination with the number of React Native pages included in the Native pages and the system operating environment of the mobile terminal, thereby implementing independent full event tracking of the React Native page. The full event tracking can be used independently as a React Native plug-in, and no longer depends on full event tracking of the Native page. In addition, full event tracking of an IOS/ANDROID operating environment is implemented, thereby enhancing the adaptability of event tracking.

According to embodiments of the present disclosure, embodiments of a full event tracking method for pages are provided. It should be noted that steps in the flowcharts in the accompanying drawings may be performed in a computer system, such as a set of computer-executable instructions. Although a logical order is shown in the flowcharts, steps shown or described may be performed in an order different from that in this place in some cases.

In this embodiment, a full event tracking method for pages is provided, which may be used in a computer device, such as a mobile phone or a tablet computer. FIG. 1 is a flowchart of the full event tracking method for pages according to embodiments of the present disclosure. As shown in FIG. 1, the process includes the following steps.

Step S101: Obtain Native pages of an application program of a mobile terminal and a system operating environment.

The application program is a software program that runs on the mobile terminal and is configured to implement a specific function. Specifically, there are many types of application programs, including an office application program, a game application program, a social application program, a music application program, and the like. The application program has a corresponding user interface, so that the user interacts with the program through the user interface to complete the specific function.

The application program has a corresponding native application program. The Native page is a page in the native application program, that is, a native view of the native application program. The Native page is a page written by using a native development technology (for example, JAVA or KOTLIN for ANDROID operating environment, or OBJECTIVE-C or SWIFT for IOS operating environment), and the Native page can directly access a native function and an application programming interface of the application program. In the application program, switching and navigation between different Native pages (Native pages) may be performed through navigation or routing. Each Native page has its own lifecycle and state management, and can respond to a user interaction event and a system event.

The system operating environment is an operating system environment on which the application program runs. Specifically, the system operating environment may include an IOS operating system, an ANDROID operating system, etc. Different operating systems have different operating environments and application programming interfaces (APIs), and the application program is matched with the operating system.

Specifically, the computer device may obtain the system operating environment corresponding to the operating system through an application programming interface provided by the operating system. Further, the computer device may obtain the Native page of the application program by calling a related function and a related class provided by the operating system. For example, in an ANDROID operating system, an Intent object may be used to start another activity to obtain the corresponding Native page. In an IOS operating system, a navigation controller or a modal may be used to jump pages to open the Native page.

Step S102: Detect a number of React Native pages included in the Native pages.

The React Native page is a page constructed by using a React Native framework, and is configured to present a local user interactive interface in the application program. There may be one or more React Native pages (referred to as RN pages for short) in one Native page, and each RN page is wrapped in a ReactRootView of the Native page. For the case that there is only one RN page in one Native page, event tracking collection may be performed in a default collection manner. However, for the case that one Native page includes a plurality of RN pages, generation of event tracking information cannot be implemented in the default collection manner. Therefore, it is necessary to detect the number of RN pages included in the Native page, so as to determine a corresponding event tracking collection manner based on the number of RN pages, to implement precise collection of the event tracking information.

Specifically, when it is determined whether there are a plurality of RN pages in the Native page, a code file of the Native page may be parsed, and navigation or display logic of the Native page is determined based on a structure and code logic of the code file. If there are reference or jump logic of a plurality of RN pages in the code file, it indicates that there are a plurality of RN pages in the Native page.

Specifically, it is also possible to view an integration configuration file of the RN module, for example, a build-.gradle file in an ANDROID system or a Podfile file in an IOS system, and parse configuration information related to the configuration of the RN module in the configuration file, to determine the number of RN pages included in the Native page.

Specifically, it is also possible to determine whether there are a plurality of RN pages by viewing component usage of the RN page. For example, if a plurality of RN components are used in the Native page, and these components relate to different functions and UI displays, there are a plurality of RN pages in the Native page.

Certainly, the application program may also be run for testing to determine a page display condition and an interaction condition. If a plurality of different RN pages are opened in the application program, it may be determined that there are a plurality of RN pages in the Native page. A method of determining the number of React Native pages included in the Native pages is not specifically limited here, and a person skilled in the art may determine it according to an actual requirement.

Step S103: Generate, based on the number of React Native pages and the system operating environment, a page view event tracking of entering the React Native page and a page leave event tracking of leaving the React Native page.

The page view event tracking indicates an event tracking generated when entering a page. Specifically, when a new page is opened or a specific page is returned to, a page view event tracking (that is, a pageview event tracking) is generated. For example, when entering a home page, a pageview event tracking for the home page is generated. When entering a detail page from the home page, a pageview event tracking for the detail page is generated. When the detail page is closed and the home page is returned to, a pageview event tracking for the home page is generated again.

The page leave event tracking indicates an event tracking generated when leaving a page. Specifically, whenever a page is left or a page is closed, a page leave event tracking (that is, a pageleave event tracking) is generated. For example, when entering the detail page from the home page, a pageleave event tracking for the home page is generated. When the detail page is closed and the home page is returned to, a pageleave event tracking for the detail page is generated.

A number of RN pages included in the Native pages and the system operating environment are combined to determine an event tracking generation strategy when entering an RN page or leaving the RN page, where the event tracking generation strategy is used to determine a moment of generating the page view event tracking and a moment of generating the page leave event tracking. Specifically, when entering the RN page, the page view event tracking corresponding to entering the RN page is generated according to the corresponding event tracking generation strategy. When leaving the RN page, the page leave event tracking corresponding to leaving the RN page is generated according to the corresponding event tracking generation strategy.

In the full event tracking method for pages provided in this embodiment, by detecting the number of React Native pages included in the Native page, and in combination with the number of React Native pages and the system operating environment of the mobile terminal, automatic collection of the page view event tracking and the page leave event tracking is performed for each React Native page. Therefore, it is no longer limited to event tracking of a single React Native page, and full event tracking for a plurality of React Native pages is implemented. In addition, independent full event tracking of the React Native page is implemented, and no longer depends on a full event tracking technology of the Native page. Moreover, full event tracking can be implemented with the system operating environment, thereby enhancing the adaptability of event tracking.

In this embodiment, a full event tracking method for pages is provided, which may be used in a computer device, such as a mobile phone or a tablet computer. FIG. 2 is a flowchart of the full event tracking method for pages according to embodiments of the present disclosure. As shown in FIG. 2, the process includes the following steps.

Step S201: Obtain Native pages of an application program of a mobile terminal and a system operating environment. For detailed descriptions, refer to the related descriptions corresponding to the foregoing embodiment.

Details are not described herein again.

Step S202: Detect a number of React Native pages included in the Native pages. For detailed descriptions, refer to the related descriptions corresponding to the foregoing embodiment. Details are not described herein again.

Step S203: Generate, based on the number of React Native pages and the system operating environment, a page view event tracking of entering the React Native page and a page leave event tracking of leaving the React Native page.

Specifically, when the Native pages include one React Native page, step S203 may include the following steps.

Step S2031: Determine a view lifecycle corresponding to the system operating environment.

The view lifecycle includes stages such as creation, display, update, and destruction of a page view developed based on React Native. For different system operating environments, corresponding view lifecycles are different. Specifically, for an IOS operating environment, the view lifecycle is characterized by a lifecycle of a UI view controller (UIViewController). For an ANDROID operating environment, the view lifecycle is characterized by a lifecycle of a ReactActivity of an application program.

Step S2032: Determine a first moment for entering the React Native page and a second moment for leaving the React Native page based on the view lifecycle.

The first moment is used to represent an optimal moment that can trigger the page view event tracking, and the second moment is used to represent an optimal moment that can trigger the page leave event tracking. In combination with the view lifecycle, a moment of really entering the RN page and a moment of really leaving the RN page can be determined, to determine the first moment that can trigger the page view event tracking and the second moment that can trigger the page leave event tracking.

Specifically, for the IOS operating environment, due to a display mechanism of React Native, in a UIViewController initialization scenario, after a page display parameter is triggered, a root view RCTRootView corresponding to React Native is displayed first, and a body RCTRootContentView of the page is not displayed immediately, and a unique identifier reactTag of the page is not generated. Therefore, in the initialization scenario, the first moment is a moment after the body RCTRootContentView of the page is displayed, and at this time, the unique identifier reactTag of the page has been generated, indicating that the RN page has been really entered, as shown in FIG. 3.

Figure 4:
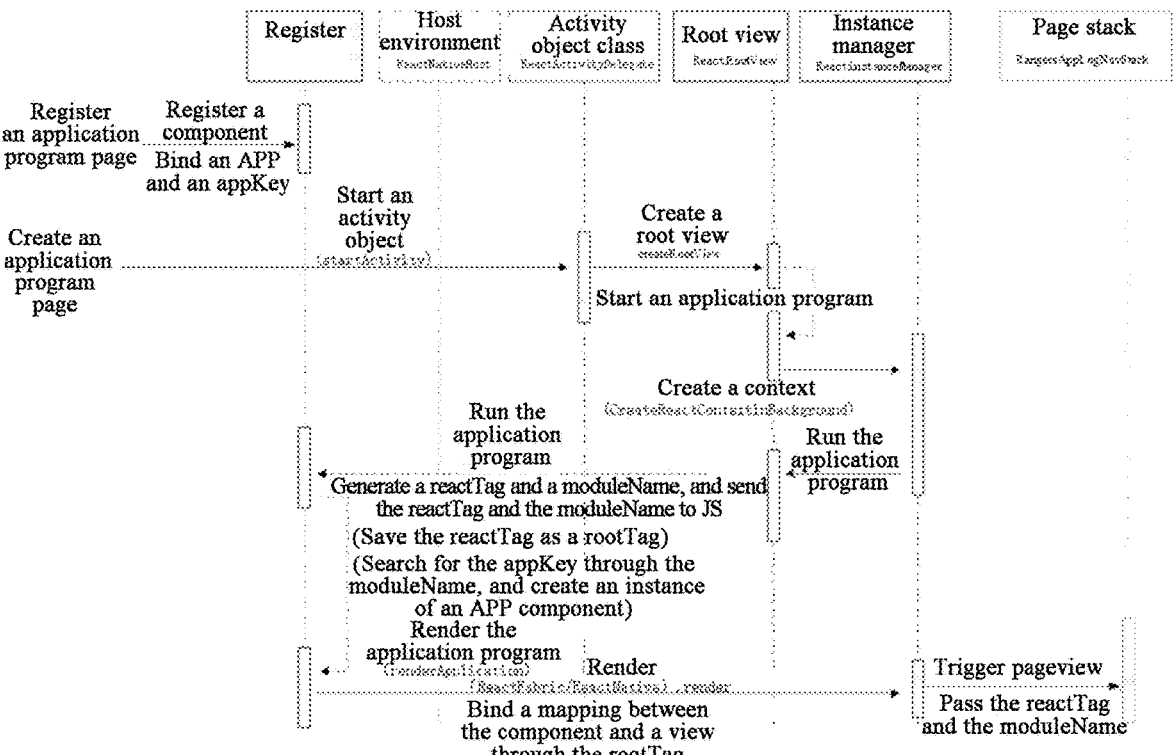
FIG. 4 is a flowchart of event tracking in an ANDROID operating environment according to some embodiments of the present disclosure.

Specifically, for the ANDROID operating environment, due to a display mechanism of React Native, in an activity object ReactActivity initialization scenario, after a page display parameter is triggered, a root view RCTRootView corresponding to React Native is displayed first, and a body of the page is not displayed immediately, and a unique identifier reactTag of the page is not generated. Therefore, in the initialization scenario, the first moment is in a callback of an instance event listener reactInstanceEventListener of a page instance manager ReactInstanceManager. At this time, the unique identifier reactTag of the page has been generated, indicating that the RN page has been really entered, as shown in FIG. 4.

Step S2033: Trigger generation of the page view event tracking at the first moment, and trigger generation of the page leave event tracking at the second moment.

After the first moment is reached, the pageview event tracking is automatically triggered by using a hook method. After the second moment is reached, the pageleave event tracking is automatically triggered by using the hook method. After the pageview event tracking and the pageleave event tracking are triggered, a corresponding page stack processes the pageview event tracking and the pageleave event tracking. The page stack sends event tracking information to a JAVASCRIPT (JS) environment, to combine page information of the RN page with JS environment configuration information, and generate the pageview event tracking or the pageleave event tracking by calling a corresponding method.

Figure 5:
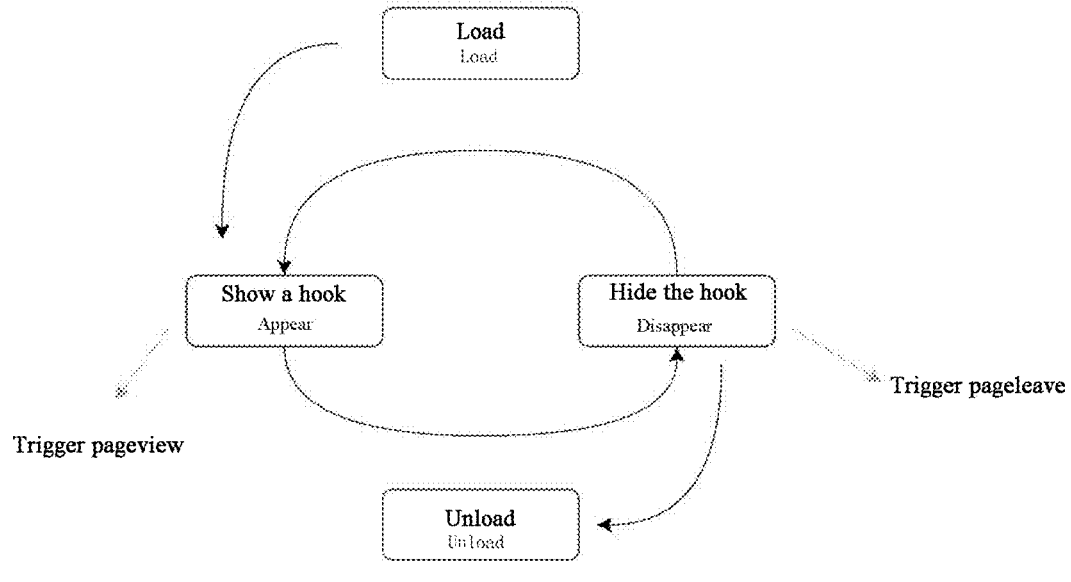
FIG. 5 is a schematic diagram of event tracking triggering in an IOS operating environment according to some embodiments of the present disclosure.

Specifically, for the IOS operating environment, triggering of the pageview event tracking and triggering of the pageleave event tracking are respectively triggered by using a display hook method Appear and a hide hook method Disappear in a lifecycle of a UI view controller UIViewController, as shown in FIG. 5.

Figure 6:
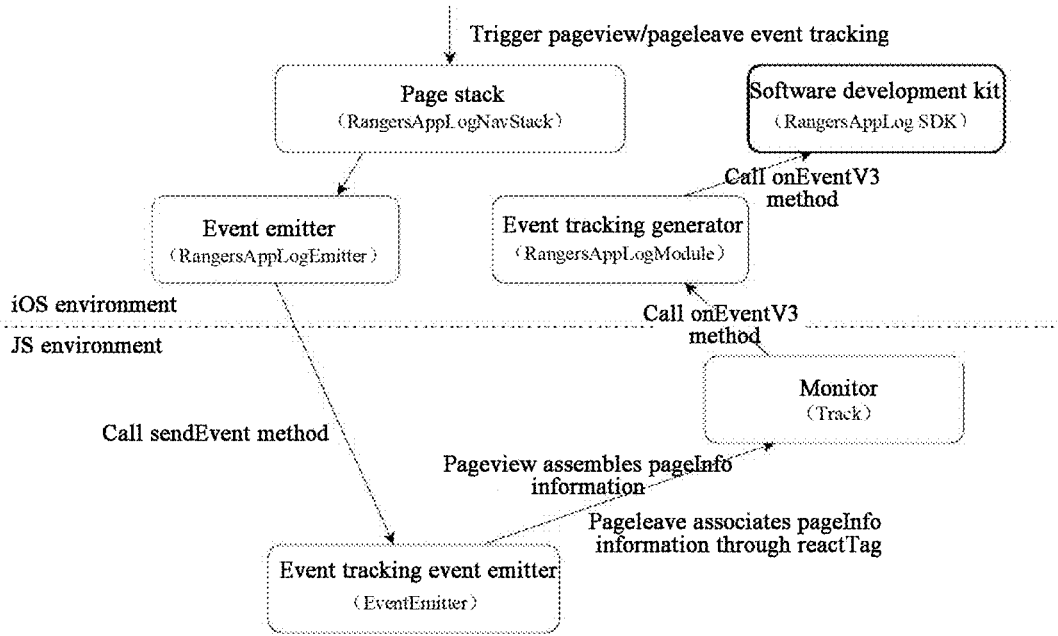
FIG. 6 is a schematic diagram of event tracking generation in an IOS operating environment according to some embodiments of the present disclosure.

After the pageview event tracking and the pageleave event tracking are triggered, a page stack RangersAppLog-NavStack sends an event tracking event related to RN page display/hide to the JS environment from the IOS operating environment by using an event emitter RangersAppLogEmitter. The JS environment receives the event tracking event, and combines a pageview event tracking event to assemble page information pageInfo, and combines a pageleave event tracking event and the unique identifier reactTag of the page to associate with the page information pageInfo. Then page information is collected and monitored by using a monitor Track, and a corresponding callback method onEventV3 is called to transmit the page information to the IOS operating environment. A generator (for example, RangersAppLog-Module) of an application program in the IOS operating environment triggers generation of an event tracking for the page information, and sends the generated pageview event tracking and pageleave event tracking to a software development kit for management and reporting, as shown in FIG. 6.

Figure 7:
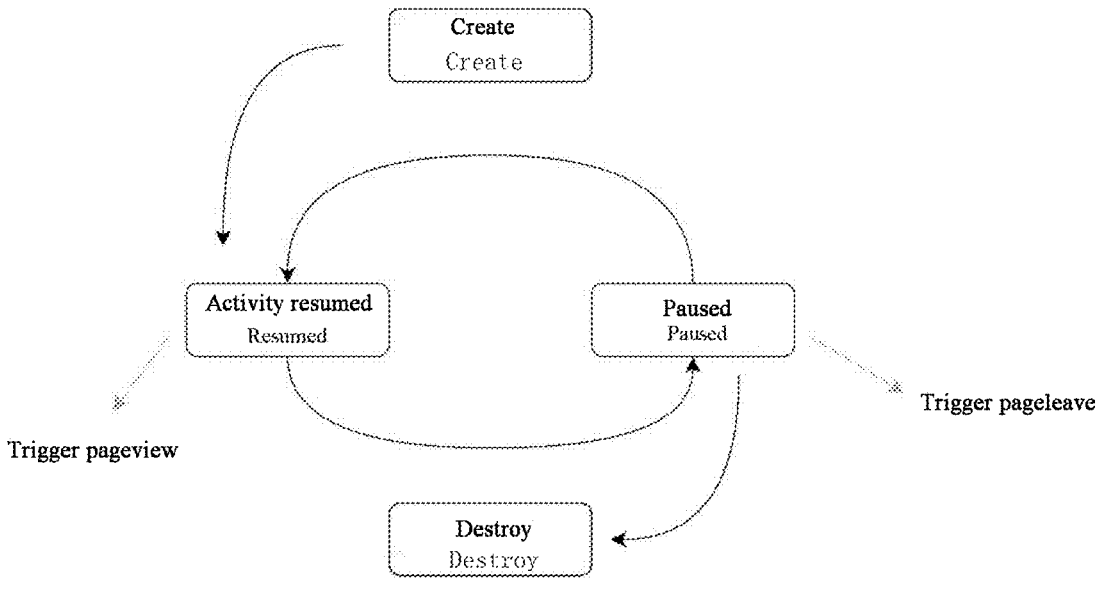
FIG. 7 is a schematic diagram of event tracking triggering in an ANDROID operating environment according to some embodiments of the present disclosure.

Specifically, for the ANDROID operating environment, triggering of the pageview event tracking and triggering of the pageleave event tracking are respectively triggered by using an activity resumed hook method ActivityResumed and an activity paused hook method ActivityPaused in a lifecycle of a ReactActivity of an application program, as shown in FIG. 7.

Figure 8:
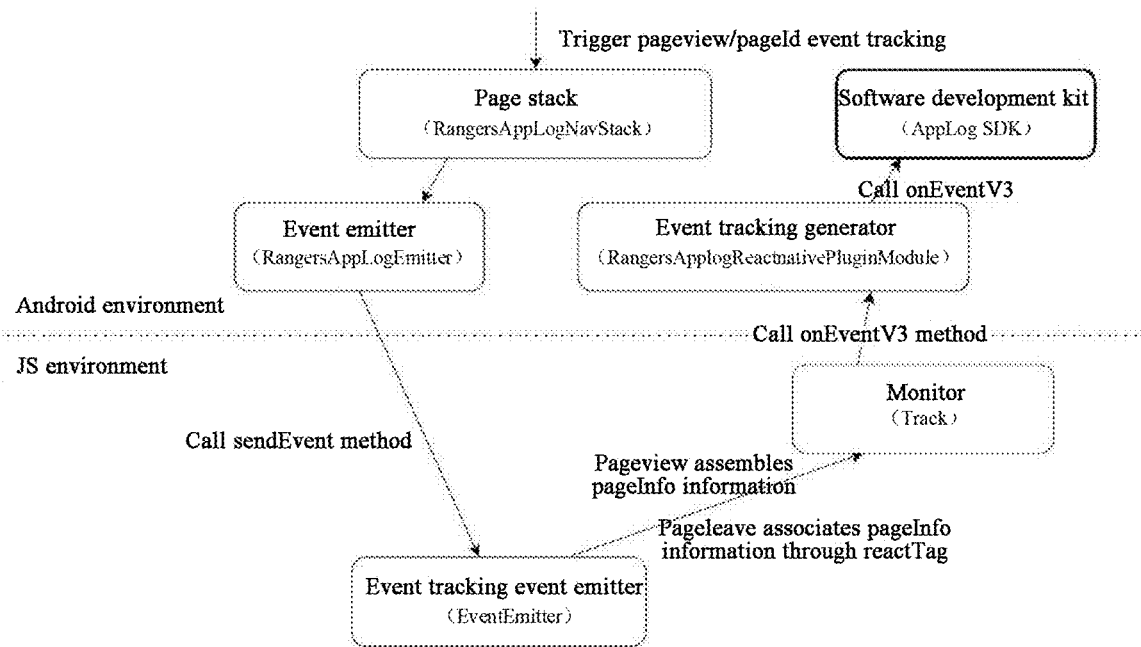
FIG. 8 is a schematic diagram of event tracking generation in an ANDROID operating environment according to some embodiments of the present disclosure.

After the pageview event tracking and the pageleave event tracking are triggered, a page stack RangersAppLog-NavStack sends an event tracking event related to RN page display/hide to the JS environment from the ANDROID operating environment by using an event emitter RangersAppLogEmitter. The JS environment receives the event tracking event, and combines a pageview event tracking event to assemble page information pageInfo, and combines a pageleave event tracking event and the unique identifier reactTag of the page to associate with the page information pageInfo. Then page information is collected and monitored by using a monitor Track, and a corresponding callback method onEventV3 is called to transmit the page information to the ANDROID operating environment. A generator (for example, RangersApplogReactnativePluginModule) of an application program in the ANDROID operating environment triggers generation of an event tracking for the page information, and sends the generated pageview event tracking and pageleave event tracking to a software development kit for management and reporting, as shown in FIG. 8.

In some optional implementations, when the system operating environment is the ANDROID operating environment, in the ANDROID operating environment, a pause hook method Pause is triggered when the application program enters a background, and a resume hook method Resume is triggered when the application program enters a foreground, resulting in incorrect triggering of the pageview event tracking and the pageleave event tracking in these two scenarios. Therefore, it is necessary to record an activity object Activity object that triggers Pause, and determine in Resume whether it is a foreground/background scenario, so as to eliminate the influence of the application program in the ANDROID operating environment being switched to the background, to trigger the pageview event tracking and the pageleave event tracking in a non-background scenario.

Correspondingly, the method may further include the following steps.

Step a1: Obtain a first React Native page corresponding to a first activity object that is changed from a visible state to an invisible state, and a second React Native page corresponding to a second activity object that is changed from an invisible state to a visible state.

Each activity object corresponds to one page, that is, different activity objects correspond to different RN pages. The first activity object is an activity object corresponding to the first React Native page. The first React Native page is an RN page that is changed from the visible state to the invisible state. Specifically, the visible state being changed to the invisible state may be switching from a current RN page to another RN page, or closing the current RN page.

The second activity object is an activity object corresponding to the second React Native page. The second React Native page is an RN page that is changed from the invisible state to the visible state. Specifically, the invisible state being changed to the visible state may be switching from another RN page to the current RN page, or opening the current RN page for the first time.

Step a2: In response to the second activity object being different from the first activity object, detect whether the second activity object exists.

It is detected whether the second activity object is the same as the first activity object. If the first activity object is the same as the second activity object, it indicates that the first React Native page and the second React Native page are the same page, that is, the page is just entered into the background. At this time, when the resume hook method Resume is triggered, the page is actually opened from the background, and generation of the pageview event tracking is not triggered at this time.

When the second activity object is different from the first activity object, it indicates that the first React Native page and the second React Native page are different pages, that is, the second React Native page is not opened from the background. In this case, it may be further detected whether the second activity object exists. When the second activity object does not exist, step a3 is performed; otherwise, step a4 is performed.

Step a3: In response to the second activity object not existing, when entering the second React Native page, trigger generation of a page view event tracking for the second React Native page.

When the second activity object does not exist, it indicates that the second React Native page corresponding to the second activity object is opened for the first time. In this case, when the resume hook method Resume is triggered, generation of the pageview event tracking for the second React Native page is triggered.

Step a4: In response to the second activity object existing and a third React Native page corresponding to a third activity object being entered from the second React Native page corresponding to the second activity object, trigger generation of a page leave event tracking for the second native interactive interface, and trigger generation of a page view event tracking for the third React Native page.

The third activity object is an activity object corresponding to the third React Native page. The third React Native page is a new page opened based on the second React Native page. Specifically, when the second activity object exists, it indicates that the second React Native page corresponding to the second activity object is not opened for the first time, that is, the second React Native page is currently displayed. In this case, after the third React Native page corresponding to the third activity object is entered, the pageleave event tracking for the second native interactive interface needs to be triggered first, and then the pageview event tracking for the third native interactive interface needs to be triggered.

For example, the second React Native page is a home page of an application program, and the third React Native page is a detail page opened based on the home page. When entering the detail page from the home page of the application program, the pageleave event tracking for the home page of the application program needs to be triggered first, and then the pageview event tracking for the detail page needs to be triggered.

In the above implementation, in the ANDROID operating environment, the second activity object and the first activity object are detected to determine whether the React Native page corresponding to the second activity object exists, so that a phenomenon of incorrect event tracking caused by the application program entering the background can be eliminated, and precise collection of event tracking information can be implemented in the ANDROID operating environment.

Specifically, when the Native pages include a plurality of React Native pages, page content of the plurality of React Native pages may be displayed in different views, and it is difficult to normally collect the event tracking information in the manner of the single React Native page. In this case, accurate collection of the event tracking information needs to be performed in combination with the view where the React Native page is located.

Correspondingly, step S203 may include the following steps.

Step S2034: Detect whether the plurality of React Native pages are in a same view.

Figure 9:
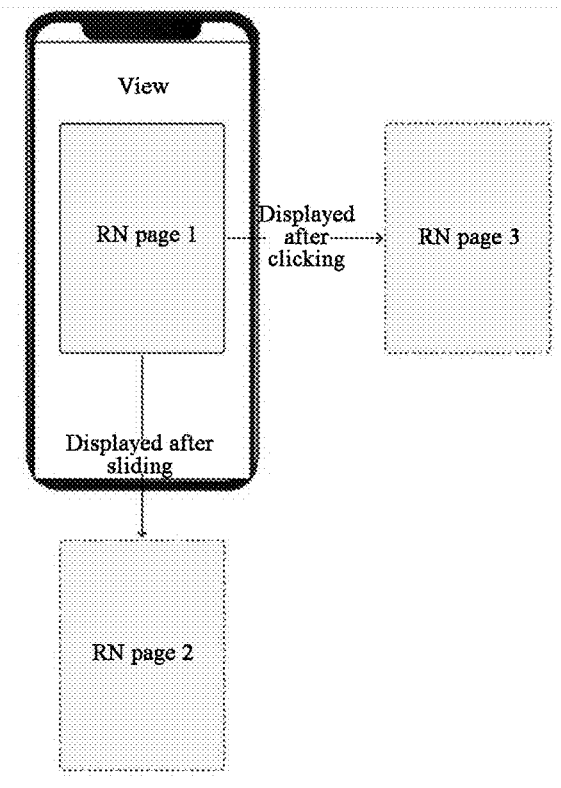
FIG. 9 is a schematic diagram of display of view page content according to some embodiments of the present disclosure.

The view is a visible range of a screen of the computer device, for example, a visible range of a screen of a mobile phone. When the Native pages include a plurality of RN pages, since the plurality of RN pages include a large amount of page content, the page content of all the RN pages is difficult to be displayed in a same view at this time. As shown in FIG. 9, content of an RN page 1 is displayed in a current view, page content of an RN page 2 is displayed after sliding, and page content of an RN page 3 is displayed after clicking. That is, when there is a large amount of page content, some content is not visible on a first screen and is visible only after a corresponding trigger operation. The page content visible after the trigger operation and the page content visible on the first screen belong to different views.

Specifically, for a case that one Native page includes a plurality of RN pages, the plurality of RN pages may be concentrated in a same view; or the plurality of RN pages may be distributed in different views; or the plurality of RN pages are distributed in different views, and each view includes a plurality of RN pages. Therefore, the event tracking information needs to be collected in combination with different distribution conditions of the RN pages.

When it is determined that one Native page includes the plurality of RN pages, it is possible to detect whether the RN pages are concentrated in the same view. If the plurality of React Native pages are in the same view, step S2035 is performed; otherwise, step S2036 is performed.

Step S2035: In response to the plurality of React Native pages being in the same view, generate a page view event tracking for each React Native page based on a display state of view content corresponding to the view, and generate a page leave event tracking for each React Native page based on a hide state of the view content corresponding to the view.

When the plurality of React Native pages are in the same view, when the view content is in the display state, the page content of each RN page in the same view is displayed simultaneously, and the pageview event tracking for each RN page can be triggered at this time. Correspondingly, when the view content is in the hide state, the page content of each RN page in the same view is hidden simultaneously, and the pageleave event tracking for each RN page can be triggered at this time.

Step S2036: In response to the plurality of React Native pages being in different views, detect whether the view is switched.

When the plurality of React Native pages are in different views, page content of different RN pages is displayed in the different views. In order to determine event tracking information for each RN page, it is necessary to detect whether the view is switched. If the view is switched, step S2037 is performed; otherwise, it indicates that the RN page is not switched, and the pageview event tracking or the pageleave event tracking for the RN page does not need to be triggered.

Step S2037: in response to the view being switched, generate a page leave event tracking for each React Native page included in a previous view, and generate a page view event tracking for each React Native page included in a current view.

Each RN page included in the view is displayed along with display of the view, and is hidden along with hiding of the view. When the view is switched, each RN page displayed in the previous view disappears, and the pageleave event tracking for each RN page in the previous view is triggered at this time. Each RN page displayed in the current view appears, and the pageview event tracking for each RN page in the current view is triggered at this time.

Figure 10:
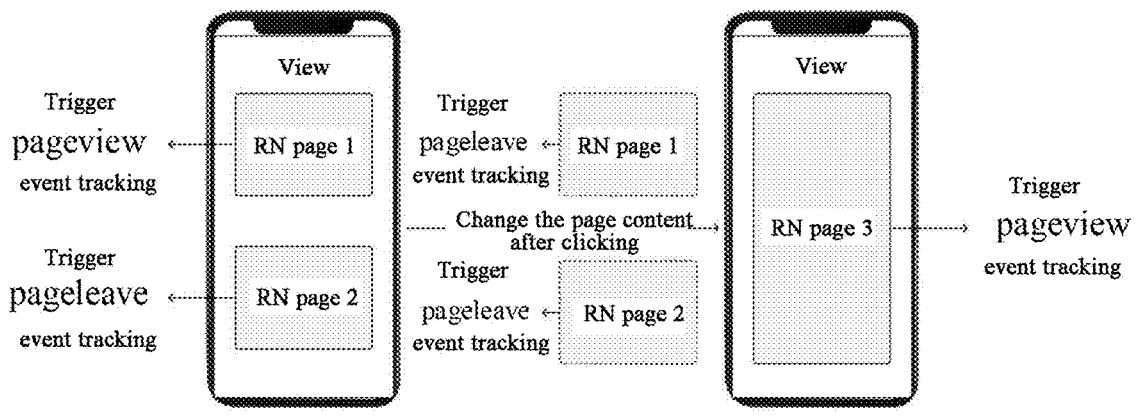
FIG. 10 is a schematic diagram of event tracking triggering when a view is switched according to some embodiments of the present disclosure.

As shown in FIG. 10, the current view includes an RN page 1 and an RN page 2. When the current view content is in the display state, the pageview event tracking for the RN page 1 and the pageview event tracking for the RN page 2 are simultaneously triggered. When a trigger operation (for example, clicking) is performed to change the current view content to an RN page 3, the pageleave event tracking for the RN page 1 and the pageleave event tracking for the RN page 2 are triggered first, and then the pageview event tracking for the RN page 3 is triggered.

Step S2038: In response to the page view event tracking for each React Native page included in the current view being generated, update page jump information for the current view based on the page leave event tracking.

When the view is switched, in order to collect a page jump path of each RN page, when the pageview event tracking is generated, previous page information (refer information) for each RN page in the current view is determined based on the pageleave event tracking, and the page jump information corresponding to each RN page in the current view is determined through the refer information.

Figure 11:
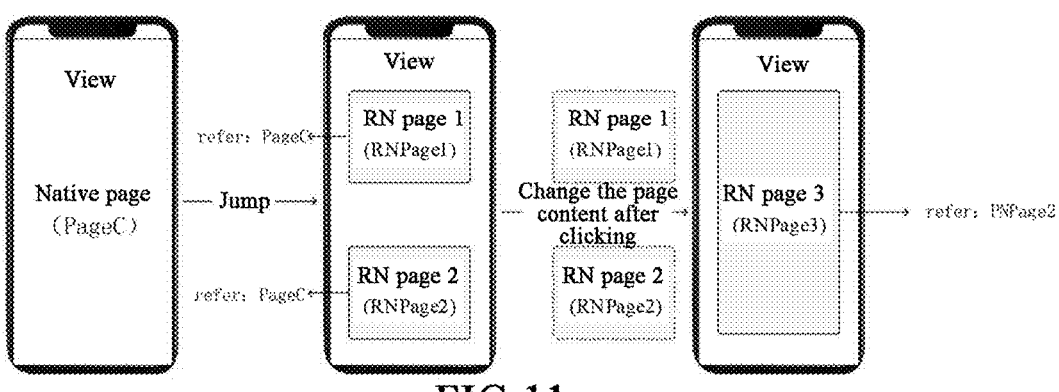
FIG. 11 is a schematic diagram of generation of page jump information according to some embodiments of the present disclosure.

As shown in FIG. 11, a first view is a page PageC displayed on a first screen of a Native page. When the first view is switched to a second view to display an RN page 1 (RNPage1) and an RN page 2 (RNPage2), refer information is obtained from the Native page in the first view, that is, refer: PageC. When the second view is switched to a third view to display an RN page 3 (RNPage3), refer information is obtained from the RN page that most recently triggers the pageleave event tracking in the second view, for example, refer: RNPage2.

It should be noted that although the pageleave event tracking for the RN page 1 and the pageleave event tracking for the RN page 2 are simultaneously triggered when the second view is switched to the third view, there is a specific execution time difference for triggering of the pageleave event tracking. Therefore, the page jump information is determined by using the RN page that most recently triggers the pageleave event tracking.

In some optional implementations, when the system operating environment is the IOS operating environment, a method of determining whether there is a React Native page in the current view includes the following steps.

Step b1: Detect whether a page displayed in the current view is a React Native page.

Step b2: In response to the page displayed in the current view being the React Native page, detect a first screen occupation ratio of the React Native page.

Step b3: In response to the first screen occupation ratio exceeding a first preset threshold, determine that one React Native page exists in the current view.

Step b4: In response to the first screen occupation ratio being less than the first preset threshold, determine that a plurality of React Native pages exist in the current view.

Specifically, for the IOS operating environment, as shown in FIG. 12, when the view content is in the display state, the pageview event tracking for each RN page in the same view is triggered in sequence along with a display hook method Appear in a lifecycle of a UI view controller UIViewController. Correspondingly, when the view content is in the hide state, the pageleave event tracking for each RN page is triggered in sequence along with a hide hook method Disappear in the lifecycle of the UI view controller UIViewController.

As shown in FIG. 13, when the view is switched, the pageleave event tracking for the RN page in the previous view is triggered first with a switch of the view content, and then the pageview event tracking for the RN page in the current view is triggered. When the pageview event tracking for the RN page in the current view is triggered, the page jump information (that is, the refer information) may be obtained from the page that most recently triggers the pageleave event tracking.

In the IOS operating environment, each page is an object instance of a UI view controller UIViewController, but object instances of the UI view controller UIViewController may be nested with each other, which makes it difficult to directly distinguish whether an object instance of the UI view controller UIViewController is a Native page or a part of the Native page.

Since each RN page needs to be placed in a UI view controller UIViewController, it is necessary to distinguish whether a current object instance of the UI view controller UIViewController is a Native page, whether the current object instance of the UI view controller UIViewController is an RN page, or whether there are a plurality of RN pages.

Specifically, here, a view in the UI view controller UIViewController may be detected to determine whether there is a React root view (ReactRootView). If there is the ReactRootView, it may be determined that a page displayed in the current view is an RN page.

Figures 14, 15:
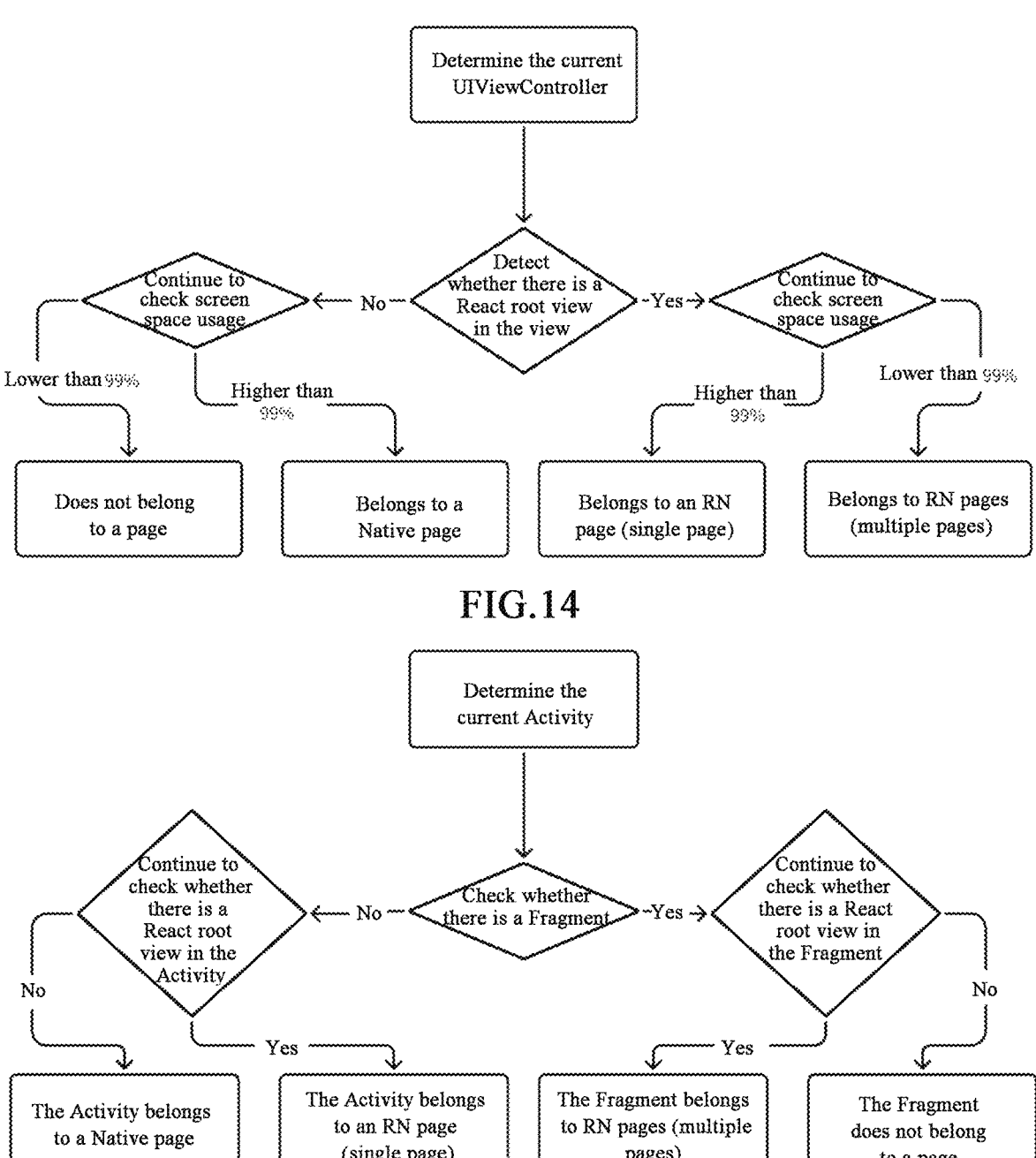
FIG. 14 is a schematic diagram of RN page determination in an IOS operating environment according to some embodiments of the present disclosure.
FIG. 15 is a schematic diagram of RN page determination in an ANDROID operating environment according to some embodiments of the present disclosure.

The first screen occupation ratio is a screen space occupation ratio of the RN page in the view. The first preset threshold is a preset screen space occupation ratio for determining that the RN page is a single page, for example, 99%. As shown in FIG. 14, when it is determined that the page displayed in the current view is the RN page, the first screen occupation ratio of the RN page is compared with the first preset threshold, to determine whether the first screen occupation ratio exceeds the first preset threshold. If the first screen occupation ratio exceeds the first preset threshold, it is determined that there is one RN page in the current view. Otherwise, it is determined that there are a plurality of RN pages in the current view.

In the above implementation, in the IOS operating environment, when it is determined that the page displayed in the current view is the React Native page, the number of React Native pages displayed in the current view is determined by detecting the screen occupation ratio, so that a corresponding event tracking strategy can be adopted for the number of React Native pages subsequently, to implement precise event tracking of the React Native page in the IOS operating environment.

In some optional implementations, in response to the system operating environment being the IOS operating environment, the method may further include the following steps.

Step c1: In response to the page displayed in the current view being not the React Native page, detect a second screen occupation ratio of the page displayed in the current view.

Step c2: In response to the second screen occupation ratio exceeding a second preset threshold, determine that the page displayed in the current view is a Native page.

The second screen occupation ratio is a screen space occupation ratio of the Native page in the view. The second preset threshold is a preset screen space occupation ratio for determining the Native page, for example, 99%.

Specifically, as shown in FIG. 14, if it is determined, by detecting the view in the UI view controller UIViewController, that there is no ReactRootView, it may be determined at this time that the page displayed in the current view is not an RN page. Further, the second screen occupation ratio of the page corresponding to the object instance of the UI view controller UIViewController is detected, to determine whether the second screen occupation ratio exceeds the second preset threshold. If the second screen occupation ratio exceeds the second preset threshold, it is determined that the page displayed in the current view is one Native page. Otherwise, it is determined that the current view does not belong to a page.

In the above implementation, in the IOS operating environment, the type of the page displayed in the current view is detected, so that the event tracking information is triggered and generated according to the type of the page, thereby ensuring the implementation accuracy of the full event tracking.

In some optional implementations, in response to the system operating environment being the ANDROID operating environment, a method of determining whether a React Native page exists in the current view includes the following steps.

Step d1: Detect whether a child activity object exists in a current activity object.

Step d2: In response to a child activity object existing in the current activity object and a target root view existing in the child activity object, determine that a plurality of React Native pages exist in the current view, and each child activity object corresponds to one React Native page.

Step d3: In response to no child activity object existing in the current activity object and a target root view existing in the current activity object, determine that one React Native page exists in the current view.

In the ANDROID operating environment, the Native page is an object instance of an activity object Activity, and the activity object Activity may manage an object instance of a plurality of child activity objects Fragment. When one Native page includes a plurality of RN pages, a React root view ReactRootView corresponding to each RN page is stored in one child activity object Fragment for management. Therefore, it is necessary to distinguish whether the following conditions are met:

Whether there is a React root view ReactRootView in the activity object Activity, whether there is a child activity object Fragment in the activity object Activity, and whether there is a React root view ReactRootView in the child activity object Fragment.

Specifically, as shown in FIG. 15, here, content of a current activity object Activity may be detected to determine whether there is a child activity object Fragment in the current activity object Activity. If there is a child activity object Fragment, and there is a target root view (that is, the React root view ReactRootView) in the child activity object Fragment, it is determined that there are a plurality of RN pages in the current view. If there is a React root view ReactRootView in the child activity object Fragment, it is determined that the child activity object Fragment does not belong to a page.

If there is no child activity object Fragment in the current activity object Activity, and there is a React root view ReactRootView in the activity object Activity, it is determined that the current activity object Activity corresponds to one RN page. If there is no child activity object Fragment in the current activity object Activity, and there is no React root view ReactRootView in the activity object Activity, it is determined that the current activity object Activity corresponds to one Native page.

In the above implementation, in the ANDROID operating environment, whether there is a child activity object in the current activity object is detected, so that the number of React Native pages displayed in the current view is determined, so that a corresponding event tracking strategy can be adopted for the number of React Native pages subsequently, to implement precise event tracking of the React Native page in the ANDROID operating environment.

When the system operating environment is the Android operating environment, in the ANDROID operating environment, a pause hook method Pause of a child activity object Fragment is triggered when the application program enters a background. Similarly, when the application program enters a foreground, a resume hook method Resume of the child activity object Fragment is triggered, resulting in incorrect triggering of the pageview event tracking and the pageleave event tracking in these two scenarios.

To solve the above problem, as shown in FIG. 16, when a pause hook method Pause corresponding to an activity object Activity1 is triggered, information of the activity object Activity1 is recorded. When a resume hook method Resume of a child activity object Fragment is triggered, an activity object Activity2 to which the child activity object Fragment belongs may be obtained, information of the activity object Activity2 is recorded, and the information of the activity object Activity2 is compared with the information of the activity object Activity1. If the information of the activity object Activity2 is the same as the information of the activity object Activity1, it indicates that the foreground is switched from the background. In the foreground/background switching scenario, the pageview event tracking and the pageleave event tracking are not triggered. If the information of the activity object Activity2 is different from the information of the activity object Activity1, the pageview event tracking and the pageleave event tracking are normally triggered.

In some optional implementations, after the influence of the background is eliminated, a method of triggering the pageview event tracking and the pageleave event tracking may include the following steps.

Step e1: Obtain a target activity object to which the child activity object belongs.

Step e2: Before generation of a page view event tracking for a React Native page corresponding to the child activity object is triggered, trigger generation of a page leave event tracking for a React Native page corresponding to a child activity object in a previous target activity object.

Since the child activity object Fragment belongs to the activity object Activity, when the pageview event tracking for the RN page corresponding to the child activity object Fragment is triggered, it is necessary to first trigger the pageleave event tracking for the RN page corresponding to the Fragment in the previously recorded target activity object, and then trigger the pageview event tracking for the RN page corresponding to the current Fragment.

In the above implementation, in the ANDROID operating environment, the target activity object to which the child activity object belongs is detected to trigger the page view event tracking and the page leave event tracking of the React Native page, so that event tracking triggering of the React Native page integrated in the fragment manner can be processed, and full event tracking of the React Native page integrated in the fragment manner is implemented.

In some optional implementations, in response to the system operating environment being the ANDROID operating environment, the method may further include the following steps.

Step f1: Obtain a first view displayed by a current activity object and a second view corresponding to a previous activity object.

Step f2: In response to the second view being switched to the first view, generate a page leave event tracking for a React Native page corresponding to all child activity objects in the previous activity object.

Step f3: Pull page jump information from the previous activity object based on the page leave event tracking.

Step f4: Trigger generation of a page view event tracking for a React Native page corresponding to a child activity object in the current activity object based on the page jump information.

For the ANDROID operating environment, as shown in FIG. 17, when the view content is in the display state, the pageview event tracking for each RN page in the same view is triggered in sequence along with a resume hook method Resume in a lifecycle of a child activity object Fragment. Correspondingly, when the view content is in the hide state, the pageleave event tracking for each RN page is triggered in sequence along with a pause hook method Pause in the lifecycle of the child activity object Fragment.

In the ANDROID operating environment, different activity objects correspond to different view pages. The first view is a view displayed by the current activity object, and the second view is a view corresponding to the previous activity object. When the view is switched, that is, when the second view corresponding to the previous activity object is jumped to the first view corresponding to the current activity object, since the first view is hidden, the pageleave event tracking for the RN page corresponding to all the child activity objects in the previous activity object may be triggered at this time, to implement triggering of the pageleave event tracking for all the RN pages in the second view.

To determine a page jump path of the RN page, after the page leave event tracking is triggered, the page jump information (that is, the refer information) is pulled from the previous activity object, and the pageview event tracking for the RN page corresponding to the child activity object in the current activity object is triggered, to implement triggering of the pageview event tracking for all the RN pages in the first view.

In this way, the fragment mode of the React Native page can be supported, and the compatibility of the full event tracking technology is improved.

Figure 18:
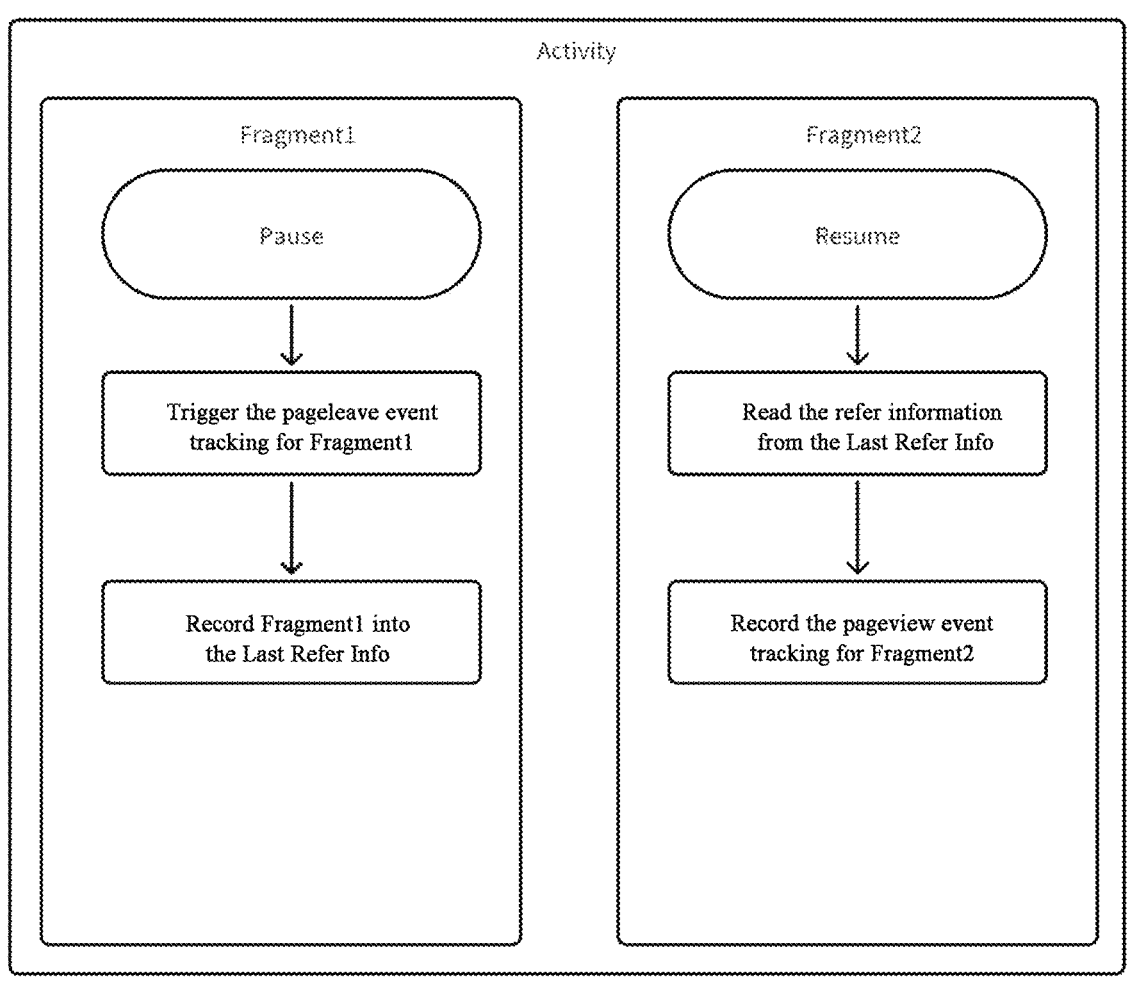
FIG. 18 is a schematic diagram of event tracking triggering and recording of page jump information in an ANDROID operating environment according to some embodiments of the present disclosure.

Specifically, when one activity object includes a plurality of child activity objects, when an RN page corresponding to one child activity object Fragment1 jumps to an RN page corresponding to another child activity object Fragment2, refer information may be obtained from the Fragment1 that most recently triggers the pageleave event tracking. As shown in FIG. 18, a current activity object Activity includes two child activity objects: Fragment1 and Fragment2, and each child activity object corresponds to a corresponding RN page. When the RN page corresponding to the child activity object Fragment1 jumps to the RN page corresponding to the Fragment2, a pause hook function Pause triggers the pageleave event tracking for the RN page corresponding to the child activity object Fragment1, and the RN page corresponding to the child activity object Fragment1 is recorded in the recent page jump information (Last Refer Info shown in FIG. 18). Before the pageview event tracking for the RN page corresponding to the child activity object Fragment2 is triggered, the refer information (that is, the RN page corresponding to the child activity object Fragment1) is read from the recent page jump information. Then, a resume hook function Resume triggers the pageview event tracking for the RN page corresponding to the child activity object Fragment2, and the pageview event tracking for the RN page corresponding to the child activity object Fragment2 is recorded.

In the above implementation, when the view is switched, the page leave event tracking for the React Native page corresponding to all the child activity objects in the previous activity object is triggered, and the page view event tracking for the React Native page corresponding to the child activity object in the current activity object is triggered based on the page jump information of the previous activity object.

The full event tracking method for pages provided in this embodiment determines a moment of triggering the page view event tracking and a moment of triggering the page leave event tracking in combination with a view lifecycle corresponding to the system operating environment when the Native pages include one React Native page, so that the event tracking information of the single React Native page can be accurately collected, and full event tracking of the single React Native page can be easily implemented. When the Native pages include a plurality of React Native pages, the views where the plurality of React Native pages are located are detected, and automatic collection of the page view event tracking and the page leave event tracking of each React Native page is implemented in combination with switching of the views. In this way, full event tracking of a plurality of React Native pages in an IOS/ANDROID operating environment is implemented, and collection of event tracking information is no longer limited to a single React Native page, thereby improving the collection inclusiveness of the event tracking information and expanding the application scenarios of the event tracking collection information. When generating the page view event tracking, the page jump information of the view is updated by using the page view event tracking, so that a page jump path can be clarified, and the accuracy of page event tracking can be improved in combination with the page jump information.

In this embodiment, a full event tracking apparatus for pages is further provided. The apparatus is configured to implement the foregoing embodiments and preferred implementations, and details of the same parts are not described again. As used below, the term "module" may be a combination of software and/or hardware that implements a predetermined function. Although the apparatus described in the following embodiments is preferably implemented in software, an implementation of hardware, or a combination of software and hardware is also possible and contemplated.

Figure 19:
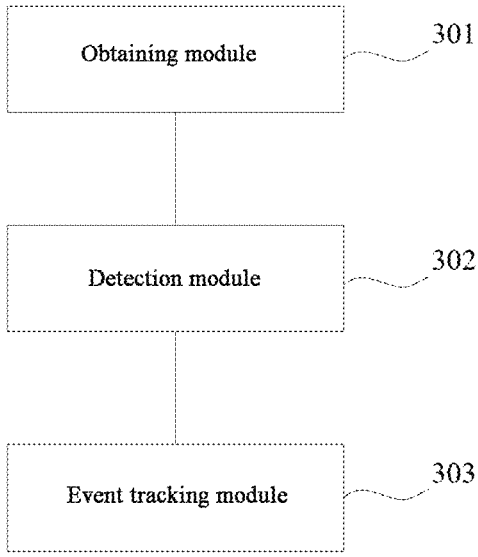
FIG. 19 is a block diagram of a structure of a full event tracking apparatus for pages according to embodiments of the present disclosure.

This embodiment provides a full event tracking apparatus for pages. As shown in FIG. 19, the apparatus includes:

an obtaining module 301, configured to obtain Native pages of an application program of a mobile terminal and a system operating environment;

a detection module 302, configured to detect a number of React Native pages included in the Native pages; and an event tracking module 303, configured to generate, based on the number of React Native pages and the system operating environment, a page view event tracking of entering the React Native page and a page leave event tracking of leaving the React Native page.

In some optional implementations, in response to the Native pages including one React Native page, the event tracking module 303 may include:

a lifecycle determining unit, configured to determine a view lifecycle corresponding to the system operating environment;

a trigger moment unit, configured to determine a first moment for entering the React Native page and a second moment for leaving the React Native page based on the view lifecycle; and an event tracking trigger unit, configured to trigger generation of the page view event tracking at the first moment, and triggering generation of the page leave event tracking at the second moment.

In some optional implementations, in response to the system operating environment being an ANDROID operating environment, the event tracking module may further include:

a page obtaining unit, configured to obtain a first React Native page corresponding to a first activity object that is changed from a visible state to an invisible state, and a second React Native page corresponding to a second activity object that is changed from an invisible state to a visible state;

a detection unit, configured to detect whether the second activity object exists in response to the second activity object being different from the first activity object;

a first event tracking trigger unit, configured to, in response to the second activity object not existing, trigger, when entering the second React Native page, generation of a page view event tracking for the second React Native page; and a second event tracking trigger unit, configured to trigger generation of a page leave event tracking for a second native interactive interface and trigger generation of a page view event tracking for a third React Native page in response to the second activity object existing and a third React Native page corresponding to a third activity object being entered from the second React Native page corresponding to the second activity object.

In some optional implementations, in response to the Native pages including a plurality of React Native pages, the event tracking module 303 may include:

a view detection unit, configured to detect whether the plurality of React Native pages are in a same view;

a third event tracking trigger unit, configured to generate a page view event tracking for each React Native page based on a display state of view content corresponding to the view and generate a page leave event tracking for each React Native page based on a hide state of the view content corresponding to the view in response to the plurality of React Native pages being in the same view;

a view switching detection unit, configured to detect whether a view is switched in response to the plurality of React Native pages being in different views; and a fourth event tracking trigger unit, configured to generate a page leave event tracking for each React Native page included in a previous view and generate a page view event tracking for each React Native page included in a current view in response to the view being switched.

In some optional implementations, the event tracking module 303 may include:

a jump information determining unit, configured to update page jump information for the current view based on the page leave event tracking in response to the page view event tracking for each React Native page included in the current view being generated.

In some optional implementations, when the system operating environment is the IOS operating environment, the apparatus may further include:

a page type detection module, configured to detect whether a page displayed in the current view is a React Native page;

a first screen occupation ratio detection module, configured to detect a first screen occupation ratio of the React Native page in response to the page displayed in the current view being the React Native page; and a first determining module, configured to determine that one React Native page exists in the current view in response to the first screen occupation ratio exceeding a first preset threshold, and determine that a plurality of React Native pages exist in the current view in response to the first screen occupation ratio being less than the first preset threshold.

In some optional implementations, in response to the system operating environment being the IOS operating environment, the apparatus may further include:

a second screen occupation ratio detection module, configured to detect a second screen occupation ratio of the page displayed in the current view in response to the page displayed in the current view being not the React Native page; and a second determining module, configured to determine that the page displayed in the current view is a Native page in response to the second screen occupation ratio exceeding a second preset threshold.

In some optional implementations, in response to the system operating environment being the ANDROID operating environment, the apparatus may further include:

an activity object detection module, configured to detect whether a child activity object exists in a current activity object; and a page determining module, configured to determine that a plurality of React Native pages exist in the current view and each child activity object corresponds to one React Native page in response to a child activity object existing in the current activity object and a target root view existing in the child activity object, and determine that one React Native page exists in the current view in response to no child activity object existing in the current activity object and a target root view existing in the current activity object.

In some optional implementations, in response to the system operating environment being the ANDROID operating environment, the apparatus may further include:

an activity object obtaining module, configured to obtain a target activity object to which the child activity object belongs; and an event tracking trigger module, configured to trigger generation of a page leave event tracking for a React Native page corresponding to a child activity object in a previous target activity object before generation of a page view event tracking for the React Native page corresponding to the child activity object is triggered.

In some optional implementations, in response to the system operating environment being the ANDROID operating environment, the apparatus may further include:

a view obtaining module, configured to obtain a first view displayed by a current activity object and a second view corresponding to a previous activity object;

a first event tracking trigger module, configured to trigger generation of a page leave event tracking for a React Native page corresponding to all child activity objects in the previous activity object in response to the second view being switched to the first view;

a jump information pulling module, configured to pull page jump information from the previous activity object based on the page leave event tracking; and a second event tracking trigger module, configured to trigger generation of a page view event tracking for a React Native page corresponding to a child activity object in the current activity object based on the page jump information.

Further functional descriptions of the foregoing modules and units are the same as those of the corresponding embodiments, and are not described herein again.

The full event tracking apparatus for pages in this embodiment is presented in the form of a functional unit. The unit herein refers to an ASIC circuit, a processor and a memory that execute one or more software or fixed programs, and/or another apparatus that may provide the foregoing functions.

The full event tracking apparatus for pages provided in this embodiment detects a number of React Native pages included in a Native page, and automatically collects a page view event tracking and a page leave event tracking for each React Native page in combination with the number of React Native pages and a system operating environment of a mobile terminal. In this way, event tracking is no longer limited to a single React Native page, and full event tracking for a plurality of React Native pages is implemented. In addition, independent full event tracking of the React Native page is implemented, and the full event tracking is no longer dependent on a full event tracking technology of the Native page. In addition, the full event tracking can be connected to the system operating environment, thereby improving the adaptability of event tracking.

This embodiment of the present disclosure further provides a computer device, including the full event tracking apparatus for pages shown in FIG. 19.

Figure 20:
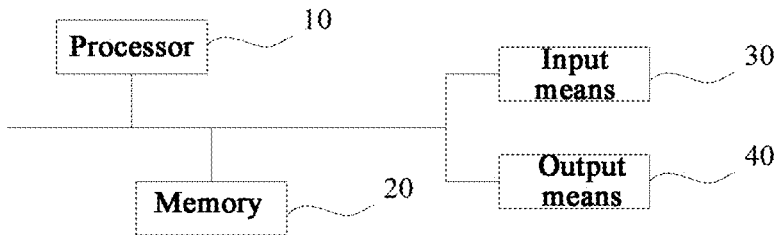
FIG. 20 is a schematic diagram of a hardware structure of a computer device according to embodiments of the present disclosure.

Referring to FIG. 20, FIG. 20 is a schematic diagram of a structure of a computer device according to an optional embodiment of the present disclosure. As shown in FIG. 20, the computer device includes one or more processors 10, a memory 20, and an interface for connecting various components, including a high-speed interface and a low-speed interface. The various components are connected to each other for communication through different buses, and may be installed on a common mainboard or otherwise installed as needed. The processor may process instructions executed in the computer device, including instructions stored in the memory or on the memory to display graphical information of a GUI on an external input/output means (such as a display apparatus coupled to the interface). In some optional implementations, if necessary, a plurality of processors and/or a plurality of buses may be used together with a plurality of memories and a plurality of memories. Similarly, a plurality of computer devices may be connected, and each device provides some necessary operations (for example, as a server array, a group of blade servers, or a multi-processor system). In FIG. 20, one processor 10 is used as an example.

The processor 10 may be a central processor, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable gate array, a general array logic, or any combination thereof.

The memory 20 stores instructions executable by at least one processor 10, to cause the at least one processor 10 to perform the method shown in the foregoing embodiments.

The memory 20 may include a program storage area and a data storage area. The program storage area may store an operating system, an application program required for at least one function, and the like. The data storage area may store data created based on use of the computer device, and the like. In addition, the memory 20 may include a high-speed random access memory, and may further include a non-transitory memory, for example, at least one magnetic disk storage device, a flash memory device, or another non-transitory solid-state storage device. In some optional implementations, the memory 20 may alternatively include a memory that is remotely disposed relative to the processor 10, and these remote memories may be connected to the computer device through a network. Examples of the network include, but are not limited to, the Internet, an intranet, a local area network, a mobile communication network, and a combination thereof.

The memory 20 may include a volatile memory, for example, a random access memory. The memory may alternatively include a non-volatile memory, for example, a flash memory, a hard disk, or a solid-state drive. The memory 20 may further include a combination of the foregoing types of memories.

The computer device further includes an input means 30 and an output means 40. The processor 10, the memory 20, the input means 30, and the output means 40 may be connected through a bus or in another manner. In FIG. 20, connection through a bus is used as an example.

The input means 30 may receive inputted numeric or character information, and generate a key signal input related to user setting and function control of the computer device, for example, a touchscreen, a keypad, a mouse, a trackpad, a touchpad, an indicator pole, one or more mouse buttons, a trackball, a joystick, and the like. The output means 40 may include a display device, an auxiliary lighting apparatus (for example, an LED), a haptic feedback apparatus (for example, a vibration motor), and the like. The display device includes but is not limited to a liquid crystal display, a light-emitting diode display, a plasma display, and the like. In some optional implementations, the display device may be a touchscreen.

The computer device further includes a communication interface, configured to enable the computer device to communicate with another device or a communication network.

This embodiment of the present disclosure further provides a computer-readable storage medium. The method according to this embodiment of the present disclosure may be implemented in hardware or firmware, or may be implemented as computer code that can be recorded in a storage medium, or may be implemented as original computer code stored in a remote storage medium or a non-transitory machine-readable storage medium and to be stored in a local storage medium through network downloading, so that the method described herein can be stored in such software processing on a storage medium using a general-purpose computer, a special-purpose processor, or programmable or special-purpose hardware. The storage medium may be a magnetic disk, an optical disc, a read-only memory, a random access memory, a flash memory, a hard disk, a solid-state drive, or the like. Further, the storage medium may further include a combination of the foregoing types of memories. It may be understood that a computer, a processor, a microprocessor controller, or programmable hardware includes a storage component that can store or receive software or computer code, and when the software or computer code is accessed and executed by the computer, the processor, or the hardware, the method shown in the foregoing embodiments is implemented.

Although the embodiments of the present disclosure are described with reference to the accompanying drawings, persons of ordinary skill in the art may make various modifications and variations without departing from the spirit and scope of the present disclosure. Such modifications and variations fall within the scope defined by the appended claims.

The invention claimed is:

1. A full event tracking method for pages, comprising:
obtaining Native pages of an application program of a mobile terminal through calling a related function or a related class provided by an operating system and a system operating environment through an application programming interface provided by the operating system, wherein the Native pages are native views of the application program, the Native pages are written by using a native development technology, and each of the Native pages has its own lifecycle and state management;
detecting a number of React Native pages included in the Native pages, wherein each React Native page is wrapped in a native view component of a Native page;
generating, by an event tracking generator deployed on a computer device and based on the number of React Native pages and the system operating environment, a page view event tracking of entering a React Native page and a page leave event tracking of leaving the React Native page; and
sending the generated page view event tracking and the generated page leave event tracking to a software development kit for management and reporting, wherein the generated page view event tracking and the generated page leave event tracking comprise page information of the React Native page and information of a corresponding event.

2. The method according to claim 1, wherein in response to the Native pages including one React Native page, generating, based on the number of React Native pages and the system operating environment, the page view event tracking of entering the React Native page and the page leave event tracking of leaving the React Native page comprises:
determining a view lifecycle corresponding to the system operating environment;
determining a first moment for entering the React Native page and a second moment for leaving the React Native page based on the view lifecycle; and
triggering generation of the page view event tracking at the first moment, and triggering generation of the page leave event tracking at the second moment.

3. The method according to claim 2, wherein in response to the system operating environment being a first system operating environment, the method further comprises:
obtaining a first React Native page corresponding to a first activity object that is changed from a visible state to an invisible state, and a second React Native page corresponding to a second activity object that is changed from an invisible state to a visible state;

in response to the second activity object being different from the first activity object, detecting whether the second activity object exists; and
in response to the second activity object not existing, triggering, when entering the second React Native page, generation of a page view event tracking for the second React Native page,
wherein a view life cycle of the first system operating environment is characterized by a lifecycle of a user interaction view controller.

4. The method according to claim 3, further comprising:
in response to the second activity object existing and a third React Native page corresponding to a third activity object being entered from the second React Native page corresponding to the second activity object, triggering generation of a page leave event tracking for the second React Native page, and triggering generation of a page view event tracking for the third React Native page.

5. The method according to claim 1, wherein in response to the Native pages include a plurality of React Native pages, generating, based on the number of React Native pages and the system operating environment, the page view event tracking of entering the React Native page and the page leave event tracking of leaving the React Native page comprises:
detecting whether the plurality of React Native pages are in a same view; and
in response to the plurality of React Native pages being in the same view, generating a page view event tracking for each of the React Native pages based on a display state of view content corresponding to the view, and generating a page leave event tracking for each of the React Native pages based on a hidden state of the view content corresponding to the view.

6. The method according to claim 5, further comprising:
in response to the plurality of React Native pages being in different views, detecting whether view switching occurs; and
in response to occurring the view switching, generating a page leave event tracking for each of the React Native pages included in a previous view, and generating a page view event tracking for each of the React Native pages included in a current view.

7. The method according to claim 6, further comprising:
in response to the page view event tracking for each of the React Native pages included in the current view being generated, updating page jump information for the current view based on the page leave event tracking.

8. The method according to claim 5, wherein in response to the system operating environment being a second system operating environment, the method further comprises:
detecting whether a page displayed in a current view is a React Native page;
in response to the page displayed in the current view being the React Native page, detecting a first screen occupancy ratio of the React Native page;
in response to the first screen occupancy ratio exceeding a first preset threshold, determining that a React Native page exists in the current view; and
in response to the first screen occupancy ratio being less than the first preset threshold, determining that a plurality of React Native pages exist in the current view,
wherein a view life cycle of the second system operating environment is characterized by a lifecycle of a ReactActivity of an application program.

9. The method according to claim 8, further comprising:

in response to the page displayed in the current view being not the React Native page, detecting a second screen occupancy ratio of the page displayed in the current view; and in response to the second screen occupancy ratio exceeding a second preset threshold, determining that the page displayed in the current view is a Native page.

10. The method according to claim 5, wherein in response to the system operating environment being a first operating environment, the method further comprises:

detecting whether a sub-activity object exists in a current activity object;

in response to the sub-activity object existing in the current activity object and a target root view existing in the sub-activity object, determining that a plurality of React Native pages exist in the current view, and each sub-activity object corresponding to a React Native page; and in response to the sub-activity object not existing in the current activity object and the target root view existing in the current activity object, determining that a React Native page exists in the current view, wherein a view life cycle of the first system operating environment is characterized by a lifecycle of a user interaction view controller.

11. The method according to claim 10, further comprising:

obtaining a target activity object to which the sub-activity object belongs; and before triggering generation of a page view event tracking for the React Native page corresponding to the sub-activity object, triggering generation of a page leave event tracking for a React Native page corresponding to the sub-activity object in a previous target activity object.

12. The method according to claim 10, further comprising:

obtaining a first view displayed by a current activity object and a second view corresponding to a previous activity object;

in response to switching from the second view to the first view, triggering generation of a page leave event tracking for a React Native page corresponding to all sub-activity objects in the previous activity object;

pulling page jump information from the previous activity object based on the page leave event tracking; and triggering generation of a page view event tracking for a React Native page corresponding to the sub-activity object in the current activity object based on the page jump information.

13. A computer device, comprising:

a memory and a processor, wherein the memory and the processor are communicatively connected to each other, the memory stores computer instructions, and the processor executes the computer instructions to:

obtain Native pages of an application program of a mobile terminal through calling a related function or a related class provided by an operating system and a system operating environment through an application programming interface provided by the operating system, wherein the Native pages are native views of the application program, the Native pages are written by using a native development technology, and each of the Native pages has its own lifecycle and state management;

detect a number of React Native pages included in the Native pages, wherein each React Native page is wrapped in a native view component of a Native page;

generate, by an event tracking generator deployed on a computer device and based on the number of React Native pages and the system operating environment, a page view event tracking of entering a React Native page and a page leave event tracking of leaving the React Native page; and send the generated page view event tracking and the generated page leave event tracking to a software development kit for management and reporting, wherein the generated page view event tracking and the generated page leave event tracking comprise page information of the React Native page and information of a corresponding event.

14. The computer device according to claim 13, wherein the computer instructions causing the computer device to, in response to the Native pages including one React Native page, generate, based on the number of React Native pages and the system operating environment, the page view event tracking of entering the React Native page and the page leave event tracking of leaving the React Native page further cause the computer device to:

determine a view lifecycle corresponding to the system operating environment;

determine a first moment for entering the React Native page and a second moment for leaving the React Native page based on the view lifecycle; and trigger generation of the page view event tracking at the first moment, and triggering generation of the page leave event tracking at the second moment.

15. The computer device according to claim 14, wherein the computer instructions further cause the computer device to, in response to the system operating environment being a first system operating environment:

obtain a first React Native page corresponding to a first activity object that is changed from a visible state to an invisible state, and a second React Native page corresponding to a second activity object that is changed from an invisible state to a visible state;

in response to the second activity object being different from the first activity object, detect whether the second activity object exists; and in response to the second activity object not existing, trigger, when entering the second React Native page, generation of a page view event tracking for the second React Native page, wherein a view life cycle of the first system operating environment is characterized by a lifecycle of a user interaction view controller.

16. The computer device according to claim 15, wherein the computer instructions further cause the computer device to:

in response to the second activity object existing and a third React Native page corresponding to a third activity object being entered from the second React Native page corresponding to the second activity object, trigger generation of a page leave event tracking for the second React Native page, and trigger generation of a page view event tracking for the third React Native page.

17. The computer device according to claim 13, wherein the computer instructions causing the computer device to, in response to the Native pages include a plurality of React Native pages, generate, based on the number of React Native pages and the system operating environment, the page view event tracking of entering the React Native page and the page leave event tracking of leaving the React Native page further cause the computer device to:

detect whether the plurality of React Native pages are in a same view; and in response to the plurality of React Native pages being in the same view, generate a page view event tracking for each of the React Native pages based on a display state of view content corresponding to the view, and generate a page leave event tracking for each of the React Native pages based on a hidden state of the view content corresponding to the view.

18. The computer device according to claim 17, the computer instructions further cause the computer device to:

in response to the plurality of React Native pages being in different views, detect whether view switching occurs; and in response to occurring the view switching, generate a page leave event tracking for each of the React Native pages included in a previous view, and generate a page view event tracking for each of the React Native pages included in a current view.

19. A non-transitory computer-readable storage medium, wherein the computer-readable storage medium is stored with computer instructions, and the computer instructions are configured to cause a computer to:

obtain Native pages of an application program of a mobile terminal through calling a related function or a related class provided by an operating system and a system operating environment through an application programming interface provided by the operating system, wherein the Native pages are native views of the application program, the Native pages are written by using a native development technology, and each of the Native pages has its own lifecycle and state management;

detect a number of React Native pages included in the Native pages, wherein each React Native page is wrapped in a native view component of a Native page;

generate, by an event tracking generator deployed on a computer device and based on the number of React Native pages and the system operating environment, a page view event tracking of entering a React Native page and a page leave event tracking of leaving the React Native page; and send the generated page view event tracking and the generated page leave event tracking to a software development kit for management and reporting, wherein the generated page view event tracking and the generated page leave event tracking comprise page information of the React Native page and information of a corresponding event.

* * * * *